United States Patent [19]

Schulz

[11] Patent Number: 4,786,116
[45] Date of Patent: Nov. 22, 1988

[54] TRAILER CONTROL VALVE DEVICE FOR THE TRAILER BRAKES OF A TRACTOR-TRAILER VEHICLE

[75] Inventor: Hans-Joachim Schulz, Wedemark, Fed. Rep. of Germany

[73] Assignee: WABCO Westinghouse Fahrzeugbremsen GmbH, Hanover, Fed. Rep. of Germany

[21] Appl. No.: 30,790

[22] Filed: Mar. 27, 1987

[30] Foreign Application Priority Data

Jun. 14, 1986 [DE] Fed. Rep. of Germany ....... 3620121

[51] Int. Cl.4 ............................................. B60T 15/02
[52] U.S. Cl. ........................................ 303/40; 303/7; 303/35; 303/118
[58] Field of Search .................... 303/7, 35, 36, 37, 28, 303/40, 118

[56] References Cited

U.S. PATENT DOCUMENTS

| 3,934,942 | 1/1976 | Klimek | 303/40 X |
| 4,493,510 | 6/1985 | Deike et al. | 303/40 X |
| 4,575,157 | 3/1986 | Reinecke | 303/40 |
| 4,609,230 | 9/1986 | McCann | 303/40 |

FOREIGN PATENT DOCUMENTS

| 2918032 | 11/1980 | Fed. Rep. of Germany . |
| 3309238 | 9/1984 | Fed. Rep. of Germany . |
| 3308082 | 9/1984 | Fed. Rep. of Germany . |
| 0012859 | 1/1983 | Japan ........................................ 303/7 |

Primary Examiner—Andres Kashnikow
Assistant Examiner—Matthew C. Graham
Attorney, Agent, or Firm—G. J. Falce

[57] ABSTRACT

A brake pressure control valve for regulating the braking pressure in the trailer brake system of a tractor-trailer vehicle, so as to develop the trailer brake pressure to a preset level ahead of the braking pressure in the tractor brake system during a pilot phase of brake operation. The preset level of this advance trailer brake pressure can be selected by an adjustable member that forms a part of the auxiliary valving that controls the point at which the pilot phase of operation is terminated. A limit stop is cooperatively arranged with this adjustable member in order to provide a means for limiting the point beyond which the auxiliary valving is activated, to thereby prevent the advance trailer brake pressure from exceeding a specified safe maximum value.

11 Claims, 2 Drawing Sheets

TRAILER CONTROL VALVE DEVICE FOR THE TRAILER BRAKES OF A TRACTOR-TRAILER VEHICLE

BACKGROUND OF THE INVENTION

A brake pressure control valve, particularly a trailer control valve, to control the brake pressure for a trailer vehicle pulled by a tractor.

Such a brake pressure control valve or trailer control valve is described in U.S. Pat. No. 4,493,510. With the trailer control valve of the prior art, it is possible during a braking action triggered by an activation of the brake valve on the tractor vehicle, that brake pressure will increase in the brake system of the trailer vehicle in advance of the brake pressure increase in the tractor vehicle. During a braking action, therefore, the tractor vehicle and the trailer vehicle will be kept stretched apart.

When the brake valve of the tractor vehicle activated, a relay piston in the trailer control valve is pressurized with a control pressure. By means of a stroke of the relay piston which then takes place, an inlet valve activated by the relay piston is opened. The braking system of the trailer vehicle is thereby connected with a pressure medium source. The trailer control valve thereby delivers a pressure which causes a pressure increase in the brake system of the trailer vehicle.

A pressure increase in the brake system of the trailer vehicle which is in advance of that in the tractor vehicle occurs when, at the beginning of the braking process, the maximum active surface area of the relay piston subject to the control pressure is pressurized, so that there is a pressure increase of the pressure delivered to the trailer control valve which is in advance of the braking application itself.

During the further course of the braking application, a further increase in the control pressure acting on the relay piston results in the opening of an inlet valve located in the relay piston, which connects a control chamber located above the relay piston with a control chamber located underneath the relay piston. The control chamber located underneath the relay piston is delineated by an annular active surface of the relay piston, which acts in opposition to the above-mentioned maximum active surface of the relay piston.

There is a pressure adjustment between the upper and the lower sides of the relay piston, in which the pressure delivered by the trailer control valve acting on the relay piston also participates. The ratio of the control pressure existing during the pilot phase to the pressure delivered by the trailer control valve is also changed, i.e., the phase of the advance is terminated, and the higher control pressure now required equals the control pressure required for the braking phase itself of the trailer vehicle. This delivery pressure advance produced in the pilot phase can be regulated.

The inlet valve located in the relay piston, consisting of a valve seat and a disc valve element, is located in a valve body, and can be moved in its longitudinal position in the relay piston. The valve body is attached to the relay piston by a spring. A valve tappet located in the relay piston projects against the disc valve element of the inlet valve in such a way that with the displacement of the valve body in the relay piston, which takes place under the action of the control pressure, the valve tappet raises the disc valve element from its valve seat. The above-mentioned connection of the two control chambers to one another, corresponding to the relay piston, is thereby established.

The distance between the valve tappet and the disc valve element is adjustable, i.e., the distance from the end of the valve tappet to the disc valve element can be varied by the distance the valve tappet is screwed into the relay piston by means of a threaded connection.

As a result of the control pressure introduced into the trailer control valve during a braking action, the valve body executes a stroke against the force of the above-mentioned spring in the relay piston, before the disc valve element of the inlet valve is raised from its seat by the valve tappet and thus the inlet valve is opened.

If, for example, the valve tappet is set so that the stroke is only small until the opening of the inlet valve, then the spring force to be overcome is also small. Accordingly, even with a relatively low control pressure, the pilot phase is ended. This means that even the advance pressure delivered by the trailer control valve is correspondingly low. Conversely, with a relatively large stroke of the valve body before the opening of the inlet valve, the advance pressure delivered is correspondingly higher.

On the trailer control valve mentioned above, the setting stroke of the valve tappet is limited in the direction of the inlet valve. The limitation is imposed by a stop corresponding to the relay piston, which prevents the valve tappet from being screwed into the relay piston beyond a specified adjustment stroke. As a result of this limitation, the minimum advance control pressure of the trailer control valve is determined.

The adjustment of the delivery pressure is generally made under load. In this case, the control inlet is connected with a control pressure sensor, and the pressure inlet is connected with a pressure medium source. The pressure to be delivered can be verified by means of a pressure measurement system, which is connected to the pressure outlet. Such an adjustment is made at the factory on a test stand. However, it can also be made on the vehicle under conditions similar to those on the test stand. The latter is necessary if, for example, the present advance brake pressure set at the factory must be adjusted to the braking force action of the trailer vehicle.

If, for example, on the occasion of a client readjustment on the vehicle, a greater advance delivery pressure is desired at the vehicle, then with the trailer control valve mentioned above, the valve tappet can easily be retracted, that is, screwed out of the relay piston to a position in which the inlet valve is spaced further from the tappet so that greater piston movement is required to open the valve. This could result in an undesirable, rapid increase of the pressure delivered to the trailer control valve. During vehicle operation, this would result in an undesirable overbraking of the trailer vehicle, which might not be immediately noticeable under relatively favorable conditions. In a critical braking situation however, e.g., on a slick road, it could lead to an abrupt locking of the braked wheels, and to the trailer vehicle veering out of line.

The object of the invention, therefore, is to improve a trailer control valve of the type described above, so that the advance brake pressure delivered to the trailer vehicle by the trailer control valve can be limited to a specified maximum pressure level.

This object is achieved by the invention described in Patent claim 1. Refinements and advantageous embodiments of the invention are described in the subclaims.

The invention has the advantage that with with an adjustment of the advance pressure to be delivered by the trailer control valve, either in the factory on a test stand or on the vehicle under conditions similar to those on the test stand, a defined maximum pressure level can be specified as the starting pressure for the beginning of regulation. In this manner, the trailer control valve is prevented from being placed in a control status in which there could be an extreme over-control of the trailer.

Another advantage of the invention is that an adjustment on the vehicle can be made even under conditions which are not similar to those on the test stand, e.g., when the brake system is depressurized, without any risk of the above-mentioned overbraking.

Another advantage results from the shape of the above-mentioned valve tappet, whereby in any position of the valve tappet, a uniform opening stroke of the inlet valve connecting the control chambers of the relay piston is achieved.

The invention is explained in greater detail below, with reference to one embodiment which is illustrated in the Figures.

FIG. 1 shows a trailer control valve with a combined inlet and outlet valve to control the advance, as well as an adjustable valve tappet for the regulation of the advance pressure.

DESCRIPTION AND OPERATION

Figure 1:
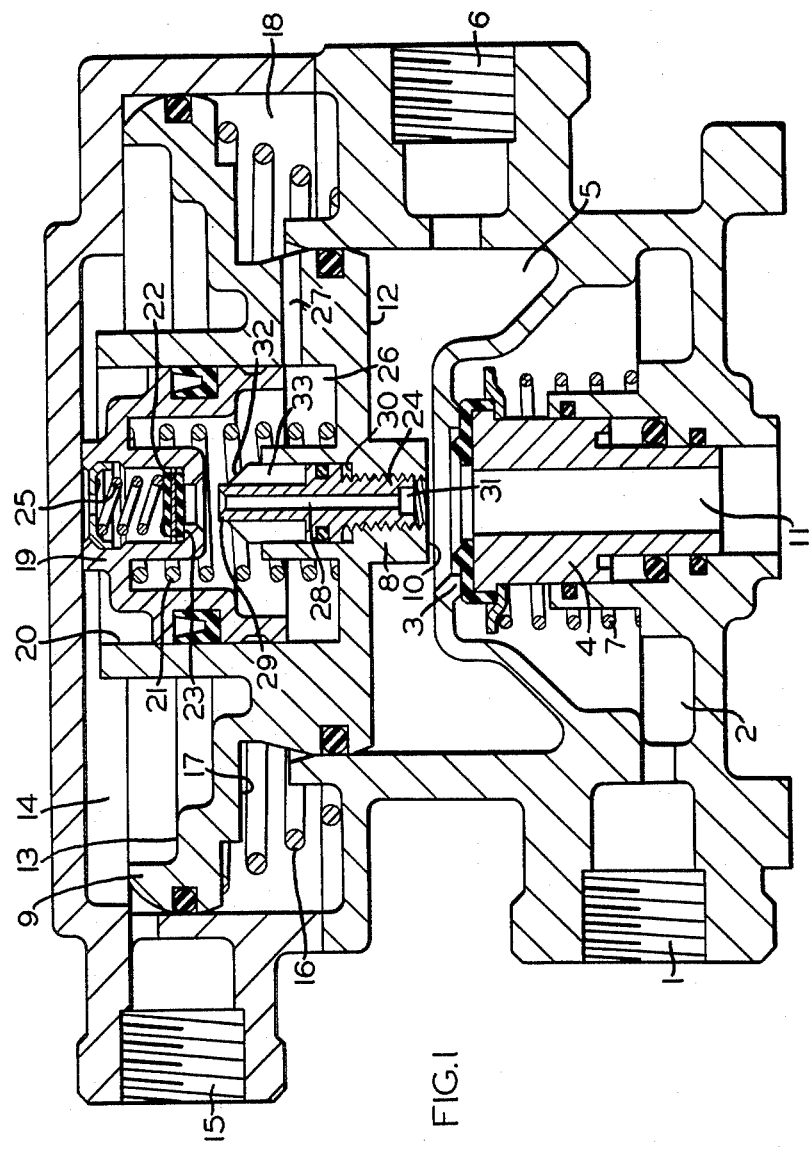
FIG. 1 shows a trailer control valve.

A pressure medium inlet 1 with a pressure medium chamber 2 can be connected by means of an inlet valve 3, 4 with a working chamber 5 and a pressure medium outlet 6. The inlet valve consists of a seat 3, which is located in a defined position in relation to the valve housing, and a valve body 4, which is held by a spring 7 against the seat 3. The pressure medium inlet 1 is connected with a pressure medium source, and the pressure medium outlet 6 is connected with the brake system of the trailer vehicle.

An extension 8 of a relay piston 9 forms, with its active surface 10 and the valve body 4, an exhaust valve 10, 4, by means of which the working chamber 5 can be vented to atmosphere by means of an outlet 11. The working chamber 5 is delineated by an active surface 12 of the relay piston 9.

The relay piston 9, with its active surface 13, delineates a control chamber 14. By means of a pressure medium inlet 15, which can be controlled from the brake valve of the tractor vehicle, the active surface 13 of the relay piston 9 can be pressurized against the force of a return spring 16 with a control pressure of variable strength. The relay piston 9 has another active surface 17, which is located opposite the active surface 13, and which delineates an auxiliary control chamber 18.

The control chambers 14, 18 and the working chamber 5 are sealed off from one another.

An auxiliary piston 19 slides in a sealed manner in a recess 20 of the relay piston 9. The auxiliary piston 19 can be moved in its longitudinal direction against the force of a return spring 21, which is supported on the relay piston 9. A valve element 22 in the auxiliary piston 19 cooperates with a valve seat 23, formed on auxiliary piston 19, to form an inlet valve 22, 23, and with a valve seat 29, formed on a stop element 24, designed as a valve tappet located in the relay piston 9. The valve element 22 is held against the valve seat 23 by a return spring 25 seated on a retaining ring in the auxiliary piston 19. The inlet valve 22, 23 and the exhaust valve 22, 29, in combination, form an auxiliary valve 22, 23 and 22, 29.

The control chamber 14 can be connected via the auxiliary inlet valve 22, 23, and chamber 26, and a passage 27, with the auxiliary control chamber 18. The auxiliary control chamber 18 can be connected to atmosphere via the auxiliary exhaust valve 22, 29, the working chamber 5, and the outlet 11. The stop element 24, acting as a valve tappet, is designed as a hollow tappet, and has a through passage 28, by means of which the auxiliary control chamber 18 can be connected with the atmosphere.

The longitudinal position of the stop element 24 in the relay piston 9 can be adjusted in such a way that the distance between the valve seat 29 of the stop element 24 and the valve element 22 is variable. The adjustment of the stop element 24 is made by means of a tool which can be applied to a fixture of the stop element 24. The adjustment tool can be introduced through the outlet 11 of the valve body 4. The stop element 24 is braced in one end position, on a stop 30 of the relay piston 9, in which the distance between the valve seat 29 and the valve element 22 is greatest. The stop 30 is provided to limit the adjustment of the stop element 24 in that direction of movement in which the stop element 24 is adjusted to increase the force exerted on the auxiliary piston 19 during the opening of the auxiliary valve 22, 23 by the spring 21. In other words, the adjustment distance of the stop element 24 is limited in the opening direction toward the auxiliary outlet valve 22, 29 of the combined auxiliary inlet and outlet valve 22, 23 and 22, 29, located in the relay piston 9. In this limit position of the stop element 24, the auxiliary piston 19 executes its greatest stroke before the opening of the auxiliary inlet valve 22, 23. The auxiliary inlet valve 22, 23 is opened when valve seat 29 of the stop element 24 engages and raises the valve element 22 from the valve seat 23.

The valve element 24 has support fins 33, which are equipped with support surfaces 32. The auxiliary piston 19 is supported on the support surfaces 32 when the active surface 29 has raised the valve element 22 from the seat 23 by a specified stroke of the valve element 22. In this manner, the opening stroke of the auxiliary inlet valve 22, 23 in any set position of the stop element 24 remains the same. The stop element 24 can be adjusted in the direction of the auxiliary piston 19 by means of the above-mentioned tool until the auxiliary inlet valve 22, 23 opens and the auxiliary outlet valve 22, 29 closes. In this position of the stop element 24, chamber 26 and auxiliary control chamber 18 are constantly connected with a pressure medium, during pressurization of the control chamber 14. The support fins 33 and the support surfaces 32 are uniformly distributed over the circumference of the valve tappet, and are designed to be efficient from a flow-technology point of view.

The method of operation of the trailer control valve is as follows:

During a braking action, a control pressure is introduced by the brake valve of the tractor vehicle into the control chamber 14, and the active surface 13 of the relay piston 9 is pressurized. The relay piston is moved, with its active surface 10, toward the combined inlet and outlet valve 3, 4 and 10, 4. First, the outlet valve 10, 4 is closed, i. e, the connections of the working chamber 5 with the auxiliary control chamber 18, through the passage 28 of the stop element 24, and with the atmosphere through the outlet 11, are closed. By means of a further stroke of the relay piston 9, the inlet valve 3, 4 is opened against the force of the spring 7, by a stroke of the valve body 4. By means of the pressure medium inlet 1, a pressure medium source is connected with the pressure medium outlet 6 and the brake system of the trailer vehicle is pressurized. The opening of the inlet valve 3, 4 or the pressure effective at the pressure medium outlet 6 in this so-called pilot phase is determined by the control pressure acting on the active surface 13 and by the pressure of the working chamber 5 acting on the active surface 12, opposite to the control pressure. This pressure differential across piston 9 causes a pressure increase in the brake system of the trailer vehicle, which precedes the actual braking pressure set.

When there is an increase of the control pressure in the control chamber 14, the auxiliary piston 19 in the relay piston 9 is moved in the direction of the stop element 24 and the auxiliary inlet valve 22, 23 is opened. The control chamber 14 is thereby connected, via the chamber 26 and the passage 27, with the auxiliary control chamber 18; and the active surface 17, opposite the active surface 13, is pressurized with the control pressure. As a result of the pressurization of the active surface 17, the ratio of the control pressure to the delivery pressure, which existed during the pilot phase, is changed. The advance phase of the trailer brake pressure is thereby ended and the higher control pressure, which is now necessary, is equal to the control pressure required for the actual braking phase of the trailer vehicle.

In place of the pressurization of the auxiliary piston 19 with the pressure of a pressure medium source controlled by the brake valve, the auxiliary piston 19 can also be pressurized by the pressure present in the working chamber 5 of the brake control valve. In such a system, the relay piston 9 is closed above the auxiliary piston 19. A control chamber of the auxiliary piston 19, formed by the relay piston 9 and the auxiliary piston 19, which is sealed off from the control chamber 14, would then be connected via a passage in the relay piston 9 with the working chamber 5, similar to the arrangement shown in the aforementioned U.S. Pat. No. 4,493,510.

The combined auxiliary valve 22, 23 and 22, 29 can also be located in the auxiliary control chamber 18, so that the auxiliary control chamber 18 can be connected with an auxiliary pressure medium source or with the atmosphere.

The valve element 22 of the auxiliary inlet valve 22, 23 can also be located in the relay piston 9; in which case, the stop element 24 would be solid instead of a hollow body, and it would be located in the auxiliary piston 19 so that it could move in its longitudinal direction. The adjustment distance of the stop element 24 is then limited by the stop 30, which is located in the auxiliary piston 19. In this case, the auxiliary control chamber 18 can be connected via the auxiliary inlet valve 22, 23 with the working chamber 5. The evacuation of the auxiliary control chamber 18 then occurs via an auxiliary outlet valve of the auxiliary control chamber 18, via which the auxiliary control chamber 18 can be connected with the atmosphere.

The auxiliary valve 22, 23 and 22, 29 of the auxiliary piston 19, the spring 21, and the stop element 24 can also be located between the brake valve and the brake pressure control valve, e.g., in a separate housing.

The auxiliary piston 19 can also be formed by a membrane.

The braking process is terminated by the evacuation of the control chamber 14. The relay piston 9 and the auxiliary piston 19 are depressurized and are returned by the force of the return springs 16 and 21 to their starting positions. This results in a closing of the inlet valve 3, 4 and an opening of the outlet valve 10, 4. The auxiliary outlet valve 22, 29, located in the relay piston 9, is opened. The auxiliary control chamber 18 and the working chamber 5 are thereby evacuated via the outlet 11 into the atmosphere. The connection of the pressure medium source with the working chamber 5 is closed by the closed inlet valve 3, 4.

The level of the advance pressure can be regulated by the above-mentioned adjustment capability of the stop element 24 in the relay piston 9 up to a specified maximum pilot pressure. The maximum pilot pressure is reached when the stop element 24 touches the stop 30 in the relay piston. The stop 30, which limits the adjustment distance of the stop element 24, prevents the auxiliary piston 19 from executing a maximum stroke, unless the auxiliary inlet valve 22, 23 is open. Without opening the auxiliary inlet valve 22, 23, the auxiliary control chamber 18 would remain ineffective during a braking action. This would result in a rapid increase in the pressure released to the pressure medium outlet 6, and an undesirably high pressure level in the braking system of the trailer vehicle.

The pilot phase can be eliminated, if necessary, if the stop element 24 is moved toward the auxiliary piston 19 so that the auxiliary inlet valve 22, 23 is open and the auxiliary outlet valve 22, 29 is closed under all operating conditions of the trailer control valve.

Figure 2:
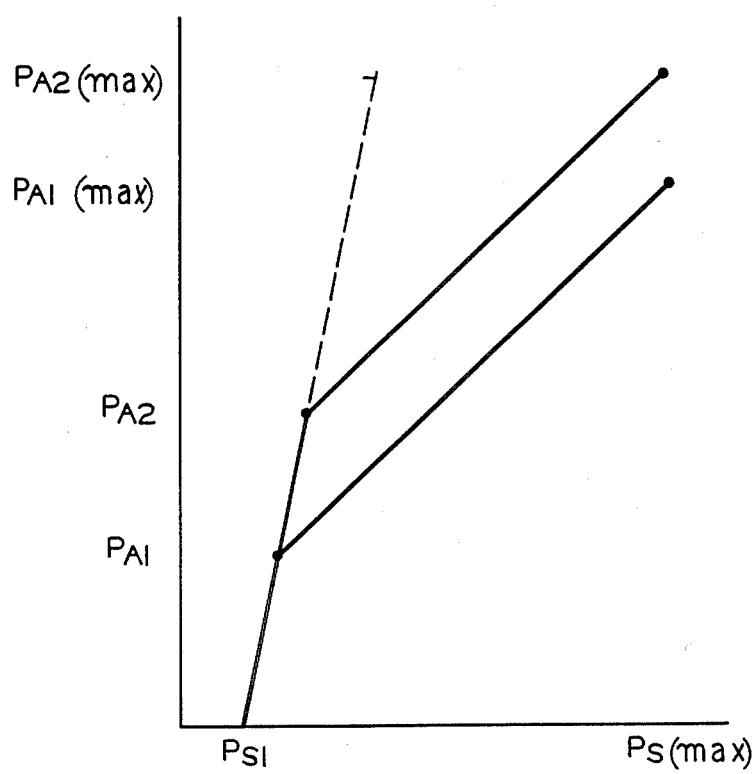
FIG. 2 shows a brake pressure diagram.

FIG. 2 shows the action of the pilot and braking pressure delivered at the pressure medium outlet 6 as a function of the control pressure introduced. The control pressure is designated $P_S$ and the delivery pressure $P_A$.

From an initial control pressure $P_{S1}$, there is a rapid advance pressure increase $P_A$, which ends with the pressurization of the auxiliary control chamber 18 at a pressure $P_{A1}$. The pressure $P_{A1}$ corresponds to a specified control position of the stop element 24. With increasing control pressure, in the regulation phase itself, there is a flatter increase of the pressure released from $P_{A1}$ to $P_{A1}$ (max.). The maximum advance pressure $P_{A2}$ is reached when the stop element 24 has reached a limit position determined by the stop 30. The delivery brake pressure can then increase to $P_{A2}$ (max.), before increasing at a more gradual rate during the regulation phase.

A pressure increase above $P_{A2}$ (dotted line) would correspond to the undesirable control status described above, relative to the above-mentioned trailer control valve described in U.S. Pat. No. 4,493,510. In this case, $P_{A2}$ (max.) would be reached even at a relatively low control pressure.

I claim:
1. A fluid pressure control valve device comprising:
   (a) first and second inlets, an outlet, and a vent port, said first inlet being connected to a control fluid under pressure and said second inlet being connected to a first source of fluid under pressure;
   (b) a differential piston abutment having a first pressure area subject to said control fluid pressure to urge movement of said piston abutment in one direction;
   (c) valve means operative in response to movement of said piston abutment for controlling fluid pressure communication between said second inlet and said outlet and between said outlet and said vent, said outlet fluid under pressure acting on a second pressure area of said piston abutment to urge movement of said piston abutment in a direction opposite said one direction;

(d) an auxiliary piston subject to one side to said control fluid under pressure and subject on the opposite side to a spring;

(e) auxiliary valve means carried by said auxiliary piston and operable for connecting said control fluid under pressure to a third pressure area of said piston abutment to urge movement thereof in said opposite direction;

(f) an adjustable member spaced apart relative to said auxiliary valve means an adjustable distance so as to effect said operation of said auxiliary valve means when the force of said control fluid pressure acting on said auxiliary piston is sufficient to compress said spring a predetermined amount corresponding to the distance said adjustable member is spaced apart from said auxiliary valve means; and (g) a stop fixed relative to said adjustable member to limit the maximum adjustable distance said adjustable member can be spaced apart from said auxiliary valve means.

2. A fluid pressure control valve device, as recited in claim 1, wherein said stop is located in said piston abutment.

3. A fluid pressure control valve device, as recited in claim 1, wherein said auxiliary piston is located in said piston abutment and is movable in a direction corresponding to the longitudinal axis of said piston abutment.

4. A fluid pressure control valve device, as recited in claim 1, wherein said auxiliary valve means includes:

(a) a valve seat formed in said auxiliary piston; and (b) a valve element normally engageable with said valve seat.

5. A fluid pressure control valve device, as recited in claim 4, wherein said auxiliary piston, said adjustable member, and said stop are located in said piston abutment.

6. A fluid pressure control valve device, as recited in claim 1, wherein said adjustable member is located in said piston abutment.

7. A fluid pressure control valve device, as recited in claim 1, wherein said stop and said adjustable member are located in said piston abutment.

8. A fluid pressure control valve device, as recited in claim 1, wherein said auxiliary valve means includes:

(a) a valve seat;

(b) a first valve element normally engageable with said valve seat to interrupt said connection of said control fluid under pressure to said third pressure area of said piston abutment; and (c) said adjustable member having an active surface engageable with said first valve element to unseat said valve element to establish said connection of said control fluid under pressure with said third area of said piston abutment, and disengageable from said first valve element to open a through passage in said adjustable member via which said third area of said piston abutment is vented.

9. A fluid pressure control valve device, as recited in claim 8, wherein said valve seat is formed in said auxiliary piston; and said auxiliary piston, said adjustable member, and said stop are located in said piston abutment.

10. A fluid pressure control valve device, as recited in claim 9, wherein said valve means includes:

(a) a valve member having a second valve element and a through passage communicated with said vent port; and (b) an active surface formed on said piston abutment engageable with said second valve element, said through passage of said adjustable member being communicated with said through passage of said valve member when said active surface, formed on said piston abutment, is engaged with said second valve member, whereby said fluid under pressure effective on said third area of said piston abutment is vented via said vent port.

11. A fluid pressure control valve device, as recited in claim 8, wherein said adjustable member is formed with at least one support surface engageable with said auxiliary piston, so that in any selected position of said adjustable member relative to said auxiliary valve means, said first valve element is disengaged from said valve seat a uniform distance.

* * * * *

UNITED STATES PATENT AND TRADEMARK OFFICE
CERTIFICATE OF CORRECTION

PATENT NO. : 4,786,116
DATED : November 22, 1988
INVENTOR(S) : Hans-Joachim Schulz It is certified that error appears in the above-identified patent and that said Letters Patent are hereby corrected as shown below:

Column 7, line 6, delete "to", first occurrence, and insert --on--

Signed and Sealed this

Fourth Day of April, 1989

Attest:

DONALD J. QUIGG

Attesting Officer

Commissioner of Patents and Trademarks